Sept. 19, 1961  J. V. ATANASOFF ET AL  3,000,215

MICROBAROPHONE

Filed Sept. 27, 1951  2 Sheets-Sheet 1

INVENTORS
J. V. ATANASOFF
A. CARNVALE
BY
*G. D. O'Brien*
*R. M. Hicks* ATTYS.

Sept. 19, 1961  J. V. ATANASOFF ET AL  3,000,215
MICROBAROPHONE

Filed Sept. 27, 1951  2 Sheets-Sheet 2

INVENTORS
J. V. ATANASOFF
A. CARNVALE
BY
*L. D. O'Brien*
*R. M. Hicks* ATTYS.

United States Patent Office 3,000,215
Patented Sept. 19, 1961

3,000,215
MICROBAROPHONE
John V. Atanasoff, Fulton, Md., and Anthony Carnvale, 113 Croydon Court, Silver Spring, Md.
Filed Sept. 27, 1951, Ser. No. 248,626
5 Claims. (Cl. 73—398)
(Granted under Title 35, U.S. Code (1952), sec. 266)

This invention relates to signal translating apparatus and more particularly pertains to apparatus for electrically measuring small infrasonic variations in atmospheric pressure.

Extensive work and study has been done in the development of accurate techniques and instruments for measuring extremely low frequency pressure changes, for the purpose of forecasting weather, and in the development of instruments for measuring pressure variations in the audible range, from about 30 to 15,000 cycles per second. However, little is known about the variations in atmospheric pressure in the intermediate low frequency range from $\frac{1}{100}$ to 20 cycles per second, and in certain applications, such as the detection of pressure waves from an explosion, at great distances therefrom, it is desirable to obtain accurate measurements of the pressure variations in this range.

Since the pressure waves, due to an explosion, are highly attenuated while traveling to a point remote therefrom, it is necessary that the barophone detect extremely small pressure variations of the order of one-millionth of normal atmospheric pressure. High sensitivity is accordingly a prime requisite of a barophone which will satisfactorily measure the pressure variations due to a remote explosion.

The atmospheric pressure variations detected by a barophone include, in addition to the low frequency signals in the range of $\frac{1}{100}$ to 20 cycles per second, undesired signals below this frequency range which must be filtered out in order to obtain selective measurement of the pressure variations in the desired frequency range. Pressure responsive electromechanical transducers suitable for converting the small signals in the desired range into the electrical analogue thereof are well known. However, in the microbarographs heretofore developed, filtering of the pressure variations having a period greater than 100 seconds was unsatisfactory since, at such extremely low frequencies, the circuit parameters for a suitable electrical filter become unduly large and render electrical filtering at those frequencies impractical. Also a signal having these lower frequencies would have a tendency to overload the electrical circuits if allowed to enter the electrical circuit.

The microbarophone of the present invention discriminates against the undesired low frequencies having periods greater than 100 seconds by means of a multiple stage acoustic filter, and then translates the signals into the electrical analogue thereof, thereby eliminating the necessity of a cumbersome electrical filter to discriminate against the undesired low frequencies. Filtering in the barophone is achieved by the provision of a chamber divided by a pair of diaphragms into a pressure inlet compartment, which communicates with the atmosphere, an intermediate compartment between the diaphragms, and a reference volume compartment with which the atmospheric pressure variations are compared. The inlet and intermediate compartments each communicate with the reference volume compartment by means of high fluid impedance lines, thereby forming a two stage high-pass filter, the parameters of which are chosen such that the atmospheric pressure variations having periods greater than 100 seconds are attenuated. The diaphragm remote from the inlet compartment moves variably in accordance with the instantaneous magnitude and direction of the filtered atmospheric pressure variations and controls a variable reactance in such a manner that the magnitude and direction of the displacement of the diaphragm from its normal position may be amplified and recorded.

An important object of this invention is to provide a pressure responsive electromechanical transducer which will detect atmospheric pressure variations of the order of one-millionth of normal atmospheric pressure, and translate the signals into the electrical analogue thereof.

Another object of this invention is to provide a pressure responsive electromechanical transducer which will filter out extremely low frequency pressure variations before translating the pressure signals into the electrical analogue thereof, whereby selective measurement of a predetermined range of pressure variations may be attained.

A further object of this invention is to provide an electromechanical transducer which will translate pressure variations into electrical signals having detectable amplitude and phase corresponding to the instantaneous amplitude and direction of the pressure variations, whereby the amplitude and direction of the pressure variations may be electrically measured.

Still another object of this invention is to provide an electromechanical transducer which is uniformly responsive over the desired low frequency range and which will acoustically attenuate frequencies below the desired range.

Other objects and many of the attendant advantages of this invention will be readily appreciated as the same becomes better understood by reference to the following detailed description when considered in connection with the accompanying drawings wherein.

Figure 1:
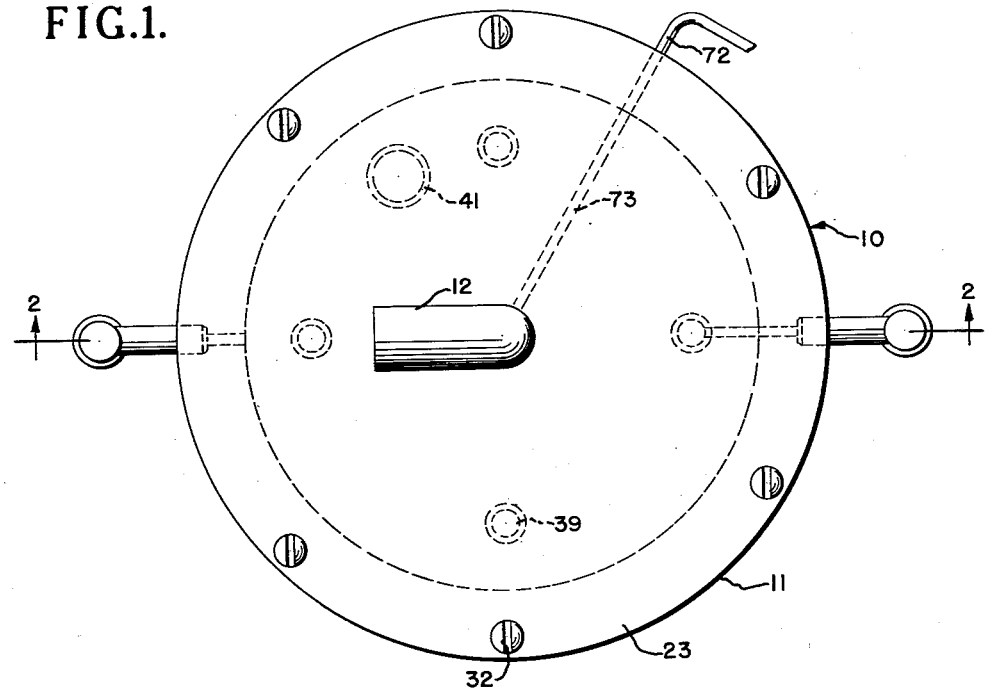
FIG. 1 is a top plan view of the barophone.

Referring now more specifically to the drawings wherein like reference characters refer to similar parts throughout the various views, numeral 10 denotes generally the barophone incorporating therein a multiple stage acoustical filter for discriminating against extremely low frequency pressure variations. The barophone generally comprises a housing 11 which communicates at one end, as by conduit 12, with source of fluid pressure being measured, such as the atmosphere, and which communicates at its other end with a reference volume 13, with which pressure variations in the above-named source are compared. The housing is divided, by a pair of spaced diaphragms 14 and 16, into an inlet compartment 17 which communicates, by means of conduit 12 with the pressure source; an intermediate compartment 18 between the diaphragms; and a reference compartment 19 which communicates with the reference volume 13, each of which compartments are filled with the same fluid medium, such as air. The diaphragm 16, hereinafter referred to as the sensitive diaphragm, is utilized to control a variable reactance whereby an electrical signal is produced which varies in amplitude and phase variably in accordance with the instantaneous amplitude and direction of movement of the sensitive diaphragm.

An acoustic impedance line 21 communicates the inlet compartment 17 with the reference compartment 19, whereby slowly varying pressure differentials between the inlet compartment and the reference compartment, are equalized over a period dependent upon the resistance of the acoustic impedance of line 21 and the compliance of the reference volume 13. The pressure variations in the inlet chamber produce a displacement of the filter diaphragm from its normal position, the amplitude of the displacement being dependent upon the amplitude and period of the pressure variations in the inlet chamber, the displacement of the filter diaphragm 14 being transmitted through the medium in the compartment 18 between the diaphragms to the sensitive diaphragm 16. Further discrimination against extremely low frequency pressure variations is attained by the provision of a second impedance line 22 which communicates the intermediate compartment 18 with the reference compartment 19, whereby a pressure differential between the intermediate and reference compartments, due to the displacement of the filter diaphragm 14 from its normal position, is reduced to zero over a relatively long period, thereby equalizing the pressure on opposite sides of the sensitive diaphragm and limiting the low frequency response thereof. It is thus deemed apparent that barophone includes the acoustical equivalent of a two stage electrical high pass filter in which rapid changes in pressure in the inlet compartment 17 cause deflections of the sensitive diaphragm 16, while relatively long period pressure variations are highly attenuated in the filters and consequently do not cause deflections of the sensitive diaphragm.

Figure 2:
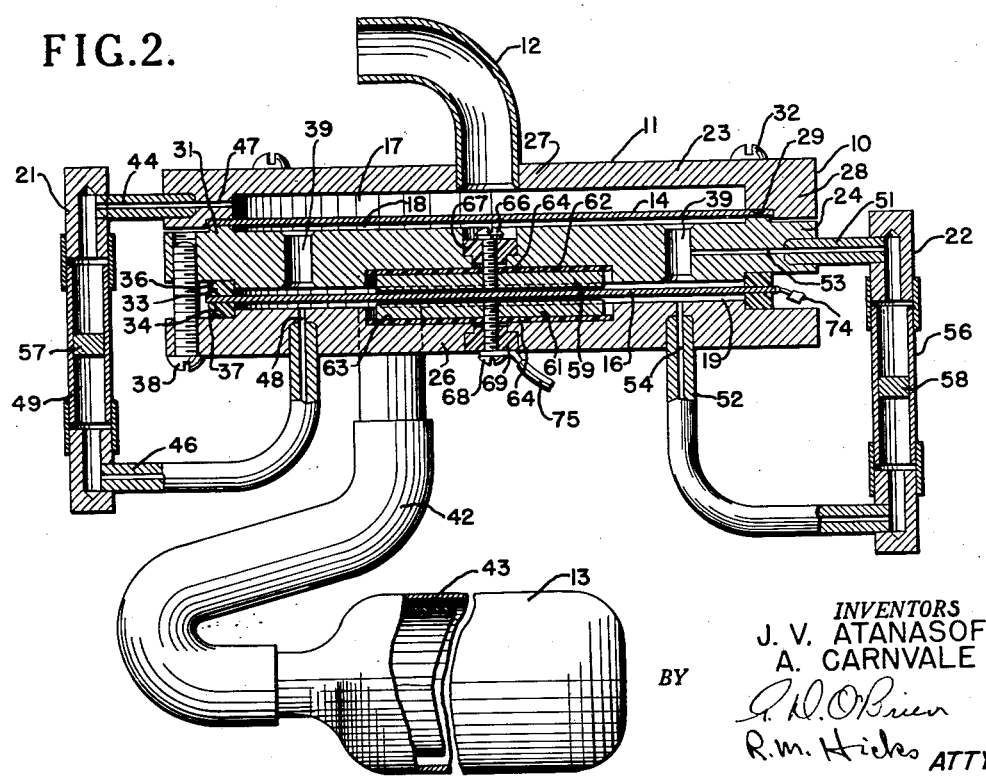
FIG. 2 is a cross-sectional view, taken on the line 2—2 of FIG. 1.

The housing 11 comprises an upper cap member 23, an intermediate disk 24, and a lower cap member 26. The conduit 12 is secured to, and extends through the top wall 27 of the upper cap member and communicates with the inlet chamber 17 defined by the top wall and the integral peripheral flange 28 thereon. An annular recess 29 is formed in the flange 28 and provides a seat for the filter diaphragm 14 which is retained in position therein by the facial boss 31 on the registering face of the intermediate disk 24. As is apparent from FIGS. 1 and 2, the upper cap member 23 and the intermediate disk 24 are secured together, as by spaced fasteners 32, the boss 31 supporting the filter diaphragm in spaced relation to the disk, whereby the diaphragm 14 is movable in either direction from its normal position variably in accordance with the instantaneous amplitude and direction of the pressure applied thereto.

The sensitive diaphragm 16 is interposed between the intermediate disk 24 and the lower cap member, rings 33 and 34, of electrical insulating material, being disposed on opposite sides of the diaphragm to support the latter in spaced relation to the registering faces of the disk and lower cap member. As is apparent, the rings 33 and 34 are seated in corresponding recesses 36 and 37 in the disk and lower cap member, respectively, the latter being secured together and to the diaphragm by suitable fasteners 38. The disk 24 has a plurality of openings 39 extending therethrough, which openings are sufficiently large to impose negligible impedance to the flow of fluid therethrough, in the frequency range which the barophone is designed to detect, whereby deflections of the filter diaphragm 14 are readily transmitted through the fluid medium in the intermediate compartment 18 to the sensitive diaphragm 16.

The reference compartment 19 communicates, by means of a low impedance passage 41 in the lower cap member and by couplings 42 to a reference volume 13 which is large compared to the volumetric displacement of the sensitive diaphragm, whereby rapid displacement of the latter, caused by atmospheric pressure variations of short duration, will not appreciably change the pressure in the reference volume. In the preferred form of the invention, the housing 11 is filled with air and consequently, due to the high rate of thermal expansion of air, the reference volume 13 is thermally insulated, as by the evacuated double-wall construction 43 illustrated. Additionally, it is contemplated that the casing in which the barophone is mounted be thermally insulated, and the barophone resiliently mounted therein to reduce the spurious signals introduced, respectively, by temperature changes and by mechanical vibrations of the casing. The importance of adequate thermal insulation will be appreciated when it is considered that .0003° C. temperature change in the air in the reference volume during the time constant of the barophone, i.e., temperature changes of that magnitude within a period of the order of 100 seconds or less, will produce a pressure change on the sensitive diaphragm of 1 dyne per square centimeter, which pressure change will give a significant reading on the recorder.

The fluid impedance line 21 includes rigid conduits 44 and 46 each of which communicate at one end thereof with passages 47 and 48 in the upper and lower cap members 23 and 26, respectively; the other ends of the conduits being connected each to opposite ends of the tube assembly 49. Similarly, the impedance line 22 includes rigid conduits 51 and 52 which communicate with passages 53 and 54 in the disk and lower cap member, respectively, the other ends of the conduits 51 and 52 being secured each to opposite ends of the filter tube assembly 56. Porous filter plugs 57 and 58 are respectively disposed in the filter tubes 49 and 56, and serve to equalize the average pressure differentials which exist between the respective compartments with which they communicate, the values of the acoustic resistances thereof being determined in a manner hereinafter set forth.

It is important that these porous plugs 57—58 be composed of material having small passages therethrough so that the passage of fluid therethrough be controlled by viscous forces. This, together with the diaphragms which operate in accordance with Hooke's Law, causes the transducer to be linear in operation.

As hereinbefore set forth, the sensitive diaphragm is deflected from its normal position, variably in accordance with the instantaneous amplitude and direction with the pressure variations in the atmosphere above the frequency range discriminated against by the two stage acoustical filter, the deflections of the sensitive diaphragm controlling a variable reactance transducer. In the preferred form of the invention, the variable reactance includes upper and lower condenser plates 59 and 61 which are respectively mounted in recesses 62 and 63 in the registering faces of the disk 24 and lower cap member 26, on opposite sides of the sensitive diaphragm 16.

The condenser plates are electrically insulated from their respective mountings by insulation 64, the upper condenser plate being secured, as by fastener 66 and insulation grommet 67 to the disk; the lower condenser plate being secured to the lower cap member by fastener 68 and insulation grommet 69. The sensitive diaphragm 16, is formed of electrically conductive material, and it is deemed apparent that the capacitance between the sensitive diaphragm and each of the condenser plates will increase and decrease in accordance with movement of the diaphragm respectively towards and away therefrom.

Figure 5:
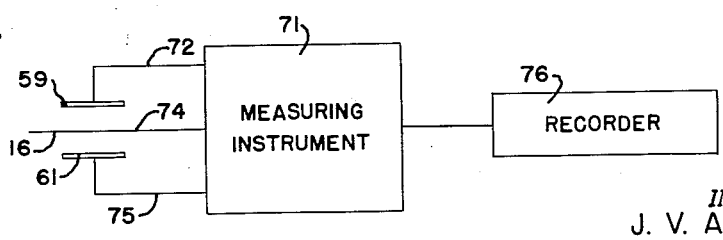
FIG. 5 is a block diagram of the barograph employing the barophone of the present invention.

The variation in the capacitance between the sensitive diaphragm and each of the condenser plates is measured by a suitable measuring instrument, diagrammatically indicated at 71, FIG 5. The measuring instrument is connected by an insulated conductor 72 which extends through the radial passage 73 in the disk 24, to the conductive fastener 66 on the upper condenser plate, the sensitive diaphragm and lower condenser plate being respectively connected to the measuring instruments by conductors 74 and 75. The electrical signal produced by the measuring instrument varies in amplitude and phase variably in accordance with the amplitude and direction of displacement of the sensitive diaphragm 16 from its normal position, and is impressed upon a recorder 76 to produce a time record of the atmospheric pressure variations within the desired frequency range.

Figure 4:
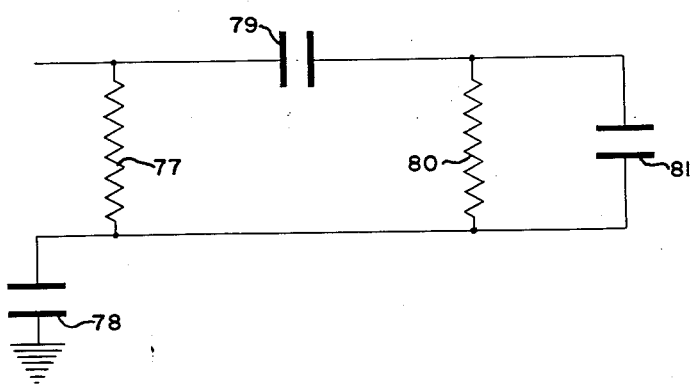
FIG. 4 is a simplified wiring diagram of the electrical analogue of the acoustical filter stages of the barophone.

Reference is now made to FIG. 4 wherein there is shown a simplified circuit which is the electrical equivalent of the two stage high pass acoustical filters in the barophone 10. In this circuit, various approximations have been effected, for the purpose of simplifying the analysis of the operation of the device, the propriety of which approximation has been theoretically and experimentally verified. In general, the acoustic resistance, inductance and compliance of the relatively small volumes in the compartments are either not included in the simplified equivalent circuit, or are lumped with other components illustrated. Additionally, the inductance and resistance of the diaphragms, which produce negligible effects in the range of frequencies being measured, have not been included in the equivalent circuit illustrated.

The first stage of the acoustical filter comprises the shunt impedance line 21 and the combined compliance of the reference compartment 19, the reference volume 13 and the connecting conduits, which impedance line and lumped compliance respectively correspond to the resistance 77 and condenser 78 in the equivalent circuit. The second stage of the filter comprises the filter diaphragm 14 and impedance line 22, which respectively correspond to condenser 79 and shunt resistance 80, the sensitive diaphragm 16 being shown as the condenser 81 in parallel with resistor 80.

As will be noted from a consideration of the equivalent circuit, the relatively high frequency signals impressed on the input thereof will be effectively divided by the series connected condensers 78, 79 and 81 in proportion to the inverse of the capacitance thereof, and in order to obtain a high ratio of output across condenser 81 to input potential, the capacitance of condensers 78 and 79, must be large as compared to the capacitance of the output condenser.

Otherwise stated the design of this apparatus is preferably in accord with the linear circuit analysis of electrical engineering which is a well known art.

In order to obtain relatively sharp cut-off or attenuation of the frequencies below the desired range, i.e., frequencies below $\frac{1}{100}$ c.p.s., it is desired to have the time constants of each of the filter stages very nearly the same. This design consideration would thus require that the RC product for the first filter stage be very nearly equal to the RC product of the second filter stage so that the cut-off frequencies of both of the filter stages would be the same. However, in order to prevent excessive loading of the first filter stage, by the second filter stage, it is necessary that the input impedance of the second stage be large, at the range of frequencies encountered, as compared to the output impedance of the first stage.

Figure 3:
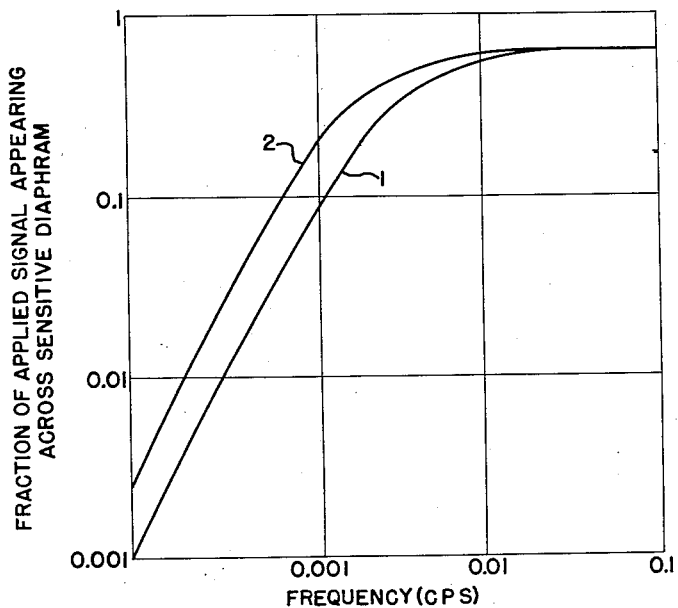
FIG. 3 shows the frequency responsive curves computed for the circuit of FIG. 4.

It is thus deemed apparent that the circuit parameters which most effectively satisfy all of the above-mentioned conditions represent a compromise between the values determined by each of the conditions, considered singly. The frequency response curves illustrated in FIG. 3 were computed for the simplified equivalent circuit of FIG. 4, with the following acoustical values of the circuit components: Condenser 78, corresponding to the sum of the compliances of the references compartment, the reference volume and the connecting passage therebetween, $$6.85 \times 10-4 \frac{cm.^3}{dyne/cm.^2}$$

condenser 79, corresponding to the compliance of the filter diaphragm 14, $$4.46 \times 10-4 \frac{cm.^3}{dyne/cm.^2}$$

condenser 81, which corresponds to the compliance of the sensitive diaphragm 16, $$1.53 \times 10-4 \frac{cm.^3}{dyne/cm.^2}$$

resistance 80, corresponding to fluid impedance plug 58, $200 \times 10^3$ acoustic ohms; and resistance 77, corresponding to the fluid impedance plug 57, $40 \times 10^3$ acoustic ohms for curve #1, and $100 \times 10^3$ acoustic ohms for curve #2.

As indicated by the curves, substantially uniform response to signals in the desired frequency range above $\frac{1}{100}$ c.p.s., and relatively sharp attenuation of the signals below this frequency range is attained by the two stage mechanical filter having the hereinbefore-mentioned circuit parameters. The curves further indicate that increasing the value of resistance 77 increases the uniform response range of the filter network. However, serious "background," due primarily to small temperature differences in the gas on opposite sides of the diaphragm, arises when the value of resistance 77 is in the order of thousands of ohms, since the small pressure differences on opposite sides of the diaphragm, caused by the temperature changes, cannot quickly balance. As hereinbefore set forth, adequate thermal insulation of the barophone must, therefore, be provided to eliminate the temperature differences in the barophone.

It is deemed apparent that the sensitive diaphragm 16 may alternatively be utilized to control a variable inductance, in which case the diaphragm would be formed of a paramagnetic material and would control the air gap of a pair of electromagnets disposed on opposite sides of the sensitive diaphragm, as is well known in the art relating to this type of transducer.

In use of the barophone for detecting pressure variations such as would be caused by a remote explosion, the inlet tube 12 is communicated with the atmosphere, by means of a suitable horn array, the pressure in the reference volume 13 being equalized, over a relatively long period by means of the impedance line 21, with the average atmospheric pressure adjacent the barophone. As the average atmospheric pressure changes, a pressure differential between the inlet chamber 17 and the reference chamber 13 arises which produces a displacement of the filter diaphragm 14, the pressure differential being slowly equalized as air flows through the impedance line 21. Displacement of the filter diaphragm produces a corresponding pressure change in the intermediate chamber which is slowly leaked-off by the impedance line 22 which communicates the intermediate chamber with the reference volume. Thus, low frequency pressure variations are highly attenuated and do not produce appreciable displacement of the sensitive diaphragm 16. For more rapid pressure variations, however, the pressure change appearing at the inlet compartment 17 is not leaked-off during the period of that pressure change, and as corresponding displacement of the filter diaphragm is effected. As hereinbefore mentioned, displacement of the filter diaphragm produces a corresponding pressure change in the intermediate chamber. However, rapidly varying pressure differentials between the intermediate chamber and the reference compartment will not be equalized by the impedance line 22, during the period thereof, and consequently the sensitive diaphragm is displaced from its neutral position.

It will thus be seen that rapid changes in atmospheric pressure will cause deflections of the sensitive diaphragms 16, while long period drifts will be attenuated by the two stage acoustical filter.

Obviously, many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A microbarophone comprising a transducer including a pressure sensitive diaphragm of electrically conductive material forming a movable condenser plate, a fixed condenser plate disposed in parallel spaced relation to said pressure sensitive diaphragm, a second diaphragm disposed in parallel spaced relation to said sensitive diaphragm for averaging the atmospheric pressure variations adjacent the microbarophone, said diaphragm being disposed between said sensitive diaphragm and the surrounding atmosphere, frequency selective means interposed between said second diaphragm and said sensitive diaphragm for impressing the average pressure on one side of the sensitive diaphragm, restrictive means for averaging the pressure variations adjacent the microbarophone and for transmitting said averaged pressures to the other side of said sensitive diaphragm, and averaging means connecting said frequency selective means to said other side of said sensitive diaphragm for limiting low frequency response thereof.

2. A signal translating apparatus comprising a casing having a pair of diaphragms therein forming an inlet compartment, an intermediate compartment between diaphragms and a reference compartment, means including a first hydraulic impedance line for equalizing average pressure differentials between said inlet and reference compartments, means including a second hydraulic impedance line for equalizing average pressure differentials between said intermediate and reference compartments, and means responsive to deflections of the diaphragm remote from said inlet compartment for producing the electrical analogue of the pressure variations impressed thereon, and frequency selective means interposed between said diaphragms.

3. The combination of claim 2 wherein the compliance of the diaphragm adjacent said inlet compartment and the compliance of the reference compartment is greater than the compliance of the diaphragm remote from the inlet compartment, means for substantially thermally isolating said reference compartment from the surrounding atmosphere whereby the reference compartment is thermally stabilized.

4. The combination of claim 2 wherein said means is responsive to deflections of the diaphragm and includes a pair of condenser plates rigidly mounted on the casing and disposed on opposite sides of the diaphragm remote from the inlet compartment, said last mentioned diaphragm comprising an electrically conductive member whereby displacement thereof differentially varies the capacitance between the electrically conductive member and the condenser plates.

5. A pressure sensitive detector comprising means including a first pressure sensitive diaphragm for providing a first fluid tight chamber, means including said first pressure sensitive diaphragm and a second pressure sensitive diaphragm for providing a second fluid tight chamber, means including said second diaphragm for providing a fluid pressure inlet chamber, a rigid walled reference chamber communicating with said first chamber, a first fluid impedance line communicating said inlet chamber and said reference chamber for equalizing the average pressure differentials existing therebetween over a predetermined period of time, a second fluid impedance line communicating said second chamber and said reference chamber for substantially equalizing the average pressure differential existing therebetween in said predetermined period of time, said first diaphragm constituting a movable condenser plate, and a fixed condenser plate disposed in spaced relation to said movable condenser plate, and frequency selective means interposed between said first and second diaphragms.

References Cited in the file of this patent

UNITED STATES PATENTS

| | | |
|---|---|---|
| 1,312,510 | Baker | Aug. 12, 1919 |
| 2,069,242 | Graham | Feb. 2, 1937 |
| 2,429,104 | Olson | Oct. 14, 1947 |